US010298570B2

(12) United States Patent
Tian et al.

(10) Patent No.: US 10,298,570 B2
(45) Date of Patent: May 21, 2019

(54) OPTOELECTRONIC SYSTEMS AND METHOD FOR OPERATING THE SAME

(71) Applicant: ams Sensors Singapore Pte. Ltd., Singapore (SG)

(72) Inventors: Yibin Tian, Mounatin House, CA (US); Hendrik Volkerink, Santa Clara, CA (US)

(73) Assignee: ams Sensors Singapore Pte. Ltd., Singapore (SG)

( * ) Notice: Subject to any disclaimer, the term of this patent is extended or adjusted under 35 U.S.C. 154(b) by 205 days.

(21) Appl. No.: 15/447,341

(22) Filed: Mar. 2, 2017

(65) Prior Publication Data

US 2017/0257366 A1 Sep. 7, 2017

Related U.S. Application Data

(60) Provisional application No. 62/303,209, filed on Mar. 3, 2016, provisional application No. 62/303,199, filed on Mar. 3, 2016, provisional application No. 62/303,192, filed on Mar. 3, 2016.

(51) Int. Cl.
*H04L 29/06* (2006.01)
*G06K 9/00* (2006.01)
*G06K 9/20* (2006.01)
*G06F 21/32* (2013.01)

(52) U.S. Cl.
CPC ......... *H04L 63/0861* (2013.01); *G06F 21/32* (2013.01); *G06K 9/00892* (2013.01); *G06K 9/00899* (2013.01); *G06K 9/209* (2013.01); *H04L 63/0853* (2013.01)

(58) Field of Classification Search
CPC .................. H04L 63/0861; H04L 63/0853
See application file for complete search history.

(56) References Cited

U.S. PATENT DOCUMENTS

| 6,587,573 | B1* | 7/2003 | Stam | B60Q 1/085 340/930 |
| 9,514,378 | B2* | 12/2016 | Armstrong-Crews | G03B 35/00 |
| 2004/0259472 | A1* | 12/2004 | Chalmers | B24B 37/013 451/5 |
| 2006/0166608 | A1* | 7/2006 | Chalmers | B24B 37/013 451/6 |
| 2016/0004920 | A1* | 1/2016 | Armstrong-Crews | G03B 35/00 348/46 |

(Continued)

FOREIGN PATENT DOCUMENTS

WO WO 2015/152829 10/2015

*Primary Examiner* — Ayoub Alata
(74) *Attorney, Agent, or Firm* — Fish & Richardson P.C.

(57) ABSTRACT

Optoelectronic systems include an array of optoelectronic modules and a computational unit. The array of optoelectronic modules and the computational unit are operable to collect data of a user of the optoelectronic system. The data can be used, for example, to authenticate the identity of the user by being used in multiple user authentication protocols. In some instances, facial recognition data can be augmented with three-dimensional data of the user and can be combined with iris recognition data to authenticate the identity of the user. Such optoelectronic systems can comprise hardware authentication systems external to auxiliary devices such as tablet computers and laptop computers.

20 Claims, 3 Drawing Sheets

(56) References Cited

U.S. PATENT DOCUMENTS

2016/0157723 A1* 6/2016 Kanick ............... A61B 5/0075
                                                    600/477
2016/0292506 A1   10/2016 Rudmann et al.
2016/0295133 A1   10/2016 Rudmann et al.

* cited by examiner ically, OPTOELECTRONIC SYSTEMS AND
METHOD FOR OPERATING THE SAME

CROSS-REFERENCE TO RELATED
APPLICATIONS

The present application claims the benefit of priority of U.S. Provisional Patent Application No. 62/303,192, Application No. 62/303,199 and Application No. 62/303,209, all filed on Mar. 3, 2016. The disclosures of the prior applications are incorporated herein by reference in their entirety.

FIELD OF THE DISCLOSURE

The present disclosure relates to optoelectronic systems including an array of optoelectronic modules.

BACKGROUND

Effective user authentication is necessary for myriad devices and processes that contain or require confidential or user-specific information. Devices, such as smartphones, tablet computers, internet-of-things-enabled devices, and automotive technology, can include confidential or user-specific information. For example, a smartphone, tablet computer or other device may include a user's banking information or internet-browsing habits. Further, a smartphone, tablet computer or other device may be used to execute payment of goods or services, and may include sensitive information, such as credit-card data (e.g., credit card numbers or passwords).

Effective user authentication is often difficult to achieve. In some cases, user authentication methods can return false positives. For example, in some instances, a two-dimensional image of an authorized user of a device can be employed to spoof facial recognition protocols. Multiple independent user verification methods can be implemented to ensure accurate user identification. However, hardware used to implement the multiple independent user verification methods can be subject to misalignment and hacking in some instances, and further can exhibit a large footprint.

SUMMARY

The present disclosure describes optoelectronic systems operable to execute multiple user authentication protocols to verify the identity of a user. In one aspect, for example, an optoelectronic system includes an array of optoelectronic modules. The array of optoelectronic modules includes an infrared-sensitive intensity imager, an auxiliary infrared-sensitive intensity imager, a spectral illuminator, a modulation illuminator, a demodulation imager, a diffuse illuminator, and a visible light-sensitive imager.

Some implementations include one or more of the following features. For example, the optoelectronic system can include a computational unit wherein an infrared-sensitive intensity imager, an auxiliary infrared-sensitive intensity imager, a spectral illuminator, a modulation illuminator, a demodulation imager, a diffuse illuminator, and a visible light-sensitive imager are each communicatively coupled to the computational unit via a coupling.

In some implementations, the computational unit includes a processor and a non-transitory computer readable medium. The non-transitory computer readable medium can include machine-readable instructions stored thereon that when executed by the processor, perform the step(s) of operating the optoelectronic system.

In some implementations, the non-transitory computer readable medium includes instructions stored thereon that when executed by the processor perform operations including initializing the optoelectronic system, executing a proximity protocol, and altering power to the modulated light illuminator, spectral illuminator, and/or diffuse illuminator.

In some implementations, the non-transitory computer readable medium includes instructions stored thereon that when executed by the processor perform operations including executing a first user authentication protocol.

In some implementations, the non-transitory computer readable medium includes instructions stored thereon that when executed by the processor perform operations including executing a second user authentication protocol.

In some implementations, the non-transitory computer readable medium includes instructions stored thereon that when executed by the processor perform operations including executing a third user authentication protocol.

In some implementations, the non-transitory computer readable medium includes instructions stored thereon that when executed by the processor perform operations including altering the power to the modulation illuminator, the spectral illuminator, and/or the diffuse illuminator.

In some implementations, the non-transitory computer readable medium includes instructions stored thereon that when executed by the processor perform operations including granting access to an auxiliary device.

In some implementations, the non-transitory computer readable medium includes instructions stored thereon that when executed by the processor perform operations including granting access to an additional auxiliary device.

In some implementations, the non-transitory computer readable medium includes instructions stored thereon that when executed by the processor perform operations including compiling user-specific data.

In some implementations, the non-transitory computer readable medium includes instructions stored thereon that when executed by the processor perform operations including constructing a user profile using the user-specific data.

In some implementations, the non-transitory computer readable medium includes instructions stored thereon that when executed by the processor perform operations including altering the operation of the auxiliary device using the user profile.

Other aspects, features and advantages will be readily apparent from the following detailed description, the accompanying drawings and the claims.

DETAILED DESCRIPTION

Figure 1:
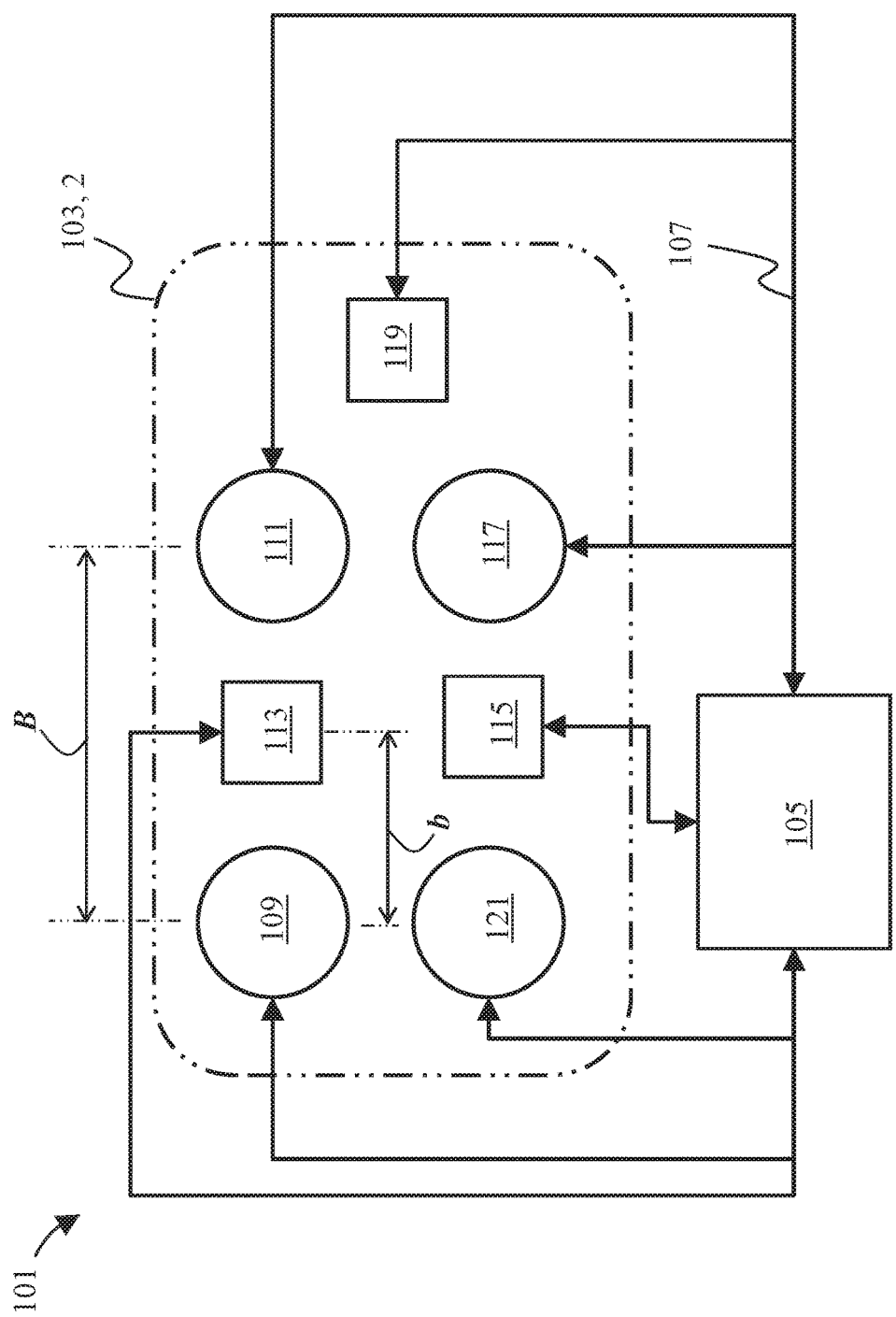
FIG. 1 depicts an example of an optoelectronic system.

FIG. 1 depicts an example of an optoelectronic system 101 operable to execute multiple user authentication protocols to verify the identity of a user of the optoelectronic system 101. The following description refers to various components within the optoelectronic system 101 being sensitive to, or being operable to generate, a particular wavelength of light. A particular wavelength of light can be a single wavelength (e.g., 940 nm) or a narrow distribution of wavelengths (e.g., 940+/−1 nm), as would be apparent to a person of ordinary skill in the art.

The optoelectronic system 101 can include an array of optoelectronic modules 103 communicatively coupled to a computational unit 105 via a coupling 107, such as electrical contacts, wires and vias. In some instances, the array of optoelectronic modules 103 is mounted to a printed circuit board or other substrate that includes the coupling 107 or portions of the coupling 107. In some instances, both the array of optoelectronic modules 103 and the computational unit 105 are mounted to the printed circuit board or other substrate, whereas in other instances, the computational unit 105 can be implemented by a host or auxiliary device, such as a smartphone, tablet computer, or desk-top computer. In some instances, data is transmitted between each optoelectronic module in the array of optoelectronic modules 103 and the computational unit 105 via the coupling 107. In some instances, power to each optoelectronic module in the array of optoelectronic modules 103 is modulated via the coupling 107. For example, power to one or more optoelectronic modules within the array of optoelectronic modules 103 can be reduced via the coupling 107.

In some instances, the computational unit 105 includes a processor including integrated circuits (e.g., a microprocessor, central processing unit, and graphics processing unit) and a non-transitory computer-readable medium (e.g., flash memory, static random access memory, and dynamic random access memory). The non-transitory computer-readable medium can include instructions that, when executed on the processor, cause the processor to operate the optoelectronic system; for example, executing multiple user authentication protocols to verify the identity of a user. Further, the operations can include pre-boot authentication or power-on authentication protocols.

The array of optoelectronic modules 103 can include an infrared-sensitive intensity imager 109 and an auxiliary infrared-sensitive intensity imager 111 separated by a baseline distance B. The array of optoelectronic modules 103 further can include a spectral illuminator 113 separated from either the infrared-sensitive intensity imager 109 or the auxiliary infrared-sensitive intensity imager 111 by a baseline distance b. The array of optoelectronic modules 103 further includes a modulation illuminator 115, a demodulation imager 117, a diffuse illuminator 119, and a visible light-sensitive imager 121. In some instances, the infrared-sensitive intensity imager 109, the auxiliary infrared-sensitive intensity imager 111, the spectral illuminator 113, the modulation illuminator 115, the demodulation imager 117, the diffuse illuminator 119, and the visible light-sensitive imager 121 are mounted on the same substrate such as a printed circuit board. In such instances, the optoelectronic modules, such as the infrared-sensitive intensity imager 109 and the auxiliary infrared-sensitive intensity imager 111, may be less prone to misalignment during operation of the optoelectronic system 101; for example, the baseline distances B, and b may remain constant from factory calibration through end-user operation.

Each of the infrared-sensitive intensity imager 109 and the auxiliary infrared-sensitive intensity imager 111 is operable to collect data such as images of a user (e.g., pairs of stereo images). The images can be used to compile three-dimensional data (e.g., a three-dimensional representation) of the user or an appendage of the user. In some instances, each of the infrared-sensitive intensity imager 109 and the auxiliary intensity imager 111 includes an array of infrared-sensitive pixels. The array of pixels can include, for example, complementary metal-oxide semiconductors and/or charge-coupled devices. Moreover, each of the infrared-sensitive intensity imager 109 and the auxiliary intensity imager 111 can include an optical assembly. Each optical assembly can include one or more refractive or diffractive optical elements. Moreover, in some instances, both the infrared-sensitive imager 109 and the auxiliary infrared-sensitive intensity imager 111 include spectral filters operable to substantially attenuate wavelengths of light that do not correspond to a particular wavelength of light (e.g., 940 nm) or a broad range of wavelengths (e.g., the infrared portion of the electromagnetic spectrum). The spectral filters can be implemented as a resin, polyester, and/or dielectric filters, for example. In some instances, the infrared-sensitive intensity imager 109 are implemented as a 2 MP-resolution infrared camera with an 82° diagonal field-of-view (FOV), and further can include a backside illumination sensor including a pixel array having 1.12 µm-sized pixels. In addition, the auxiliary infrared-sensitive intensity imager 111 can be implemented as a VGA-resolution infrared camera with a 70° diagonal FOV, and further can include a backside illumination sensor including a pixel array having 3 µm-sized pixels, for example. Other optical components, such as stops, apertures, optical coatings, auto-focus apparatuses may be present as well.

The spectral illuminator 113 can be operable to generate a spectral illumination onto the user or an appendage of the user. In some instances, the spectral illuminator 113 is operable to generate an encoded-light pattern onto the user. Accordingly, in some instances, either the infrared-sensitive intensity imager 109 or the auxiliary infrared-sensitive intensity imager 111, together with the spectral illuminator 113 can be used to generate three-dimensional representations of the user, or an appendage of the user, via an encoded-light technique.

In some instances, the spectral illuminator 113 can be is operable to generate texture onto the user such that the texture can enhance a block-matching technique. Consequently, the spectral illuminator, in combination with the infrared-sensitive intensity imager 109 and/or the auxiliary infrared-sensitive imager 111 can be used to generate three-dimensional representations of the user via a stereo or triangulation technique.

The spectral illuminator 113 can include a light-emitting component, such as a light-emitting diode or laser diode, and in some instances, includes an optical assembly. The optical assembly can include one or more microlens arrays, diffractive optical elements, and/or refractive optical elements. In some instances, the light-emitting component can be operable to generate the particular wavelength or range of wavelengths not attenuated by the spectral filters included in the infrared-sensitive intensity imager 109 and the auxiliary infrared-intensity imager 111 (e.g., 940 nm). For example, in some instances, the spectral illuminator 113 also includes a spectral filter operable to pass only the aforementioned particular wavelength or range of wavelengths. In some instances, the spectral illuminator 113 includes a light-emitting component operable to generate only the aforementioned particular wavelength or range of wavelengths.

The modulation illuminator 115 can be operable to generate a modulated illumination onto the user, such as an intensity modulated illumination. The modulated illumination can be diffuse or consist of a pattern, such as an encoded-light pattern. The modulation illuminator 115 can include a light-emitting component, such as a light-emitting diode or laser diode, and in some instance, further can include an optical assembly. The optical assembly can include a microlens array, a diffractive optical element, and/or a refractive optical element.

The demodulation imager 117 can be operable to demodulate portions of the intensity modulated illumination generated from the modulation illuminator 115 and reflected from the user. Accordingly, the modulation illuminator 115 and the demodulation imager 117 can collect proximity or distance data of the user via the indirect time-of-flight technique, for example. The demodulation imager 117 can include an array of light-sensitive pixels, and additionally can include an optical assembly. In some instances, the array of pixels includes complementary metal-oxide semiconductors and/or charge-coupled devices. The demodulation imager 117 can include spectral filters operable to substantially attenuate wavelengths of light that do not correspond to the light generated by the modulation illuminator 115, such as the infrared portion of the electromagnetic spectrum. In some instances, the spectral filters are operable to pass a particular wavelength of light (e.g., 940 nm) or a narrow range of wavelengths of light. The spectral filter can be implemented as a resin, polyester, or dielectric filter, for example. Other optical components, such as stops, apertures, optical coatings, auto-focus apparatuses may be present as well.

The diffuse illuminator 119 can be operable to generate a diffuse illumination onto the user or an appendage of the user, and can include a light-emitting component, such as a light-emitting diode or laser diode, and in some instances, includes an optical assembly. The optical assembly can include a microlens array, a diffractive optical element, a refractive optical element, and/or a diffuser. In some instances, the diffuse illumination is substantially uniform over a predefined area at a predefined distance. For example, the diffuse illuminator can emit a substantially uniform, rectangular illumination at a distance of between 10 cm and 70 cm. In some instances, the light-emitting component is operable to generate the particular wavelength or range of wavelengths not attenuated by the spectral filters included in the infrared-sensitive intensity imager 109 and the auxiliary infrared-intensity imager 111 (e.g., 940 nm).

The visible light-sensitive imager 121 can be operable to collect data, such as images of a user, and can include an array of visible-light-sensitive pixels. In some instances, the images collected by the visible light-sensitive imager 121 are used in a facial recognition protocol. The visible light-sensitive imager 121 can include an optical assembly. In some instances, the array of pixels includes complementary metal-oxide semiconductors and/or charge-coupled devices. The visible-light-sensitive imager 121 can include a spectral filter operable to substantially attenuate wavelengths of light that do not correspond to the visible portion of the electromagnetic spectrum, such as the infrared portion of the electromagnetic spectrum. The spectral filter can be a color filter array and can be implemented as a resin, polyester, or dielectric filter, for example. In some instances, the visible light-sensitive imager 121 can include a high-resolution (e.g., 2 MP) RGB camera with an 82° FOV, for example. Other optical components, such as stops, apertures, optical coatings, auto-focus apparatuses are within the scope of the present disclosure. In addition to collecting images of a user, an iris recognition protocol can be executed with the visible-light intensity imager 121 together with the infrared-sensitive imager 109 or auxiliary infrared-sensitive imager 111.

The optoelectronic system 101 can be operable to execute facial recognition and iris recognition protocols, and can be further operable to execute gaze or eye tracking protocols. In some instances, gaze or eye tracking protocols includes tracking a gaze-trace pattern of a user. For example, an authorized user may virtually trace a particular pattern with her gaze. The resulting gaze-trace pattern may correspond to a personal identification code. In some instances, gaze tracking is accomplished via the infrared-sensitive intensity imager 109 and/or the auxiliary infrared-sensitive intensity imager 111 and can be augmented by the demodulation imager 117, the modulated light illuminator 115, and the diffuse illuminator 119.

Certain optoelectronic modules within the array of optoelectronic modules 103, the computational unit 105, and the coupling 107 can be operable to execute particular authentication protocols as mentioned above; however, some of the optoelectronic modules further can be operable to enhance the particular authentication protocols. For example, the modulation illuminator 115 and the demodulation imager 117 can be used to collect or generate distance or proximity data. Then the distance or proximity data can be used to determine the power-level required by the spectral illuminator 113 to generate an eye-safe or efficient spectral illumination.

In some instances, the user's head position is determined via the visible light-sensitive imager 121. Consequently, facial recognition protocols, iris recognition protocols, gaze tracking or any other of the particular authentication protocols mentioned above can be enhanced. In some instances, gaze-tracking algorithms can be simplified for certain head positions, thereby reducing the computation resources necessary to execute a gaze-tracking authentication protocol, further power resources can be used more efficiently.

In some instances, the visible light-sensitive intensity imager is used to identify the eye color of the user. User eye color data can enhance facial recognition protocols and/or iris recognition protocols (i.e., by generating additional user data, in this case, eye color, of the user). Further, iris recognition protocols may require the diffuse illuminator 119 to generate a diffuse illumination for some iris colors (e.g., brown) and not others (e.g., green, and blue). Consequently, the diffuse illuminator 119 can be used to generate a diffuse illumination in some instances and not others, thereby using power resources more efficiently.

Other examples of enhanced protocols can be used in some cases. For example, the infrared-sensitive intensity imager 109, the auxiliary infrared-sensitive intensity imager 111, and the spectral illuminator 113 can be operable to collect three-dimensional images of the user of the optoelectronic system 101, and then the three-dimensional images can be used to determine the power-level required by the modulation illuminator 115 to generate an eye-safe or efficient modulated illumination. Consequently, the safety and/or efficiency of the aforementioned protocols, such as facial recognitions, gaze or eye-tracking, iris recognition, and three-dimensional imaging, can be enhanced.

In addition to enhancing the safety and/or efficiency of the aforementioned protocols, the optoelectronic system 101 can be employed to incorporate multiple user authentication protocols to provide effective user verification. The user authentication protocols may occur at the same time or sequentially. For example, a facial recognition protocol can be implemented with the visible light-sensitive imager 121 and the computational unit 105, wherein a two-dimensional image of the user is collected and compared to a stored and verified two-dimensional image of the user. Provided there is a match between the collected two-dimensional image and the stored and verified two-dimensional image, then the infrared-sensitive intensity imager 109, the auxiliary infrared-sensitive intensity imager 111, and the spectral illuminator 113 can be employed to generate a three-dimensional image or other three-dimensional data of the user. Consequently, the optoelectronic system 101 can prevent spoofing by a two-dimensional likeness of the authorized user.

In some instances, the user authentication protocols may occur sequentially to avoid or mitigate interference, such as interference between the infrared-sensitive intensity imager 109, the auxiliary infrared-intensity imager 111, the visible light-sensitive intensity imager 121, the modulation illuminator 115, the demodulation imager 117, the spectral illuminator 113, and the diffuse illuminator 119. In some instances, the user authentication protocols employ different encodings, and/or time and frequency multiplexing to avoid interferences. Other approaches may be used in some cases.

In some instances, the optoelectronic system 101 is employed to incorporate other multiple user authentication protocols. For example, an iris recognition protocol can be combined with a facial recognition protocol to reduce the risk of a false positive. In another example, a gaze tracking protocol can be combined with an iris recognition protocol and/or a facial recognition protocol to reduce the risk of spoofing. In such an instance, gaze-tracking can reduce the risk of a two-dimensional likeness or even a three-dimensional likeness of an authorized user being used for spoofing. In some instances, a predefined (i.e., authorized-user defined) gaze pattern can be used in combination with any of the aforementioned user authentication protocols to enhance the user authentication protocols by reducing reduce false positives or thwarting spoofing attempts.

Figure 2:
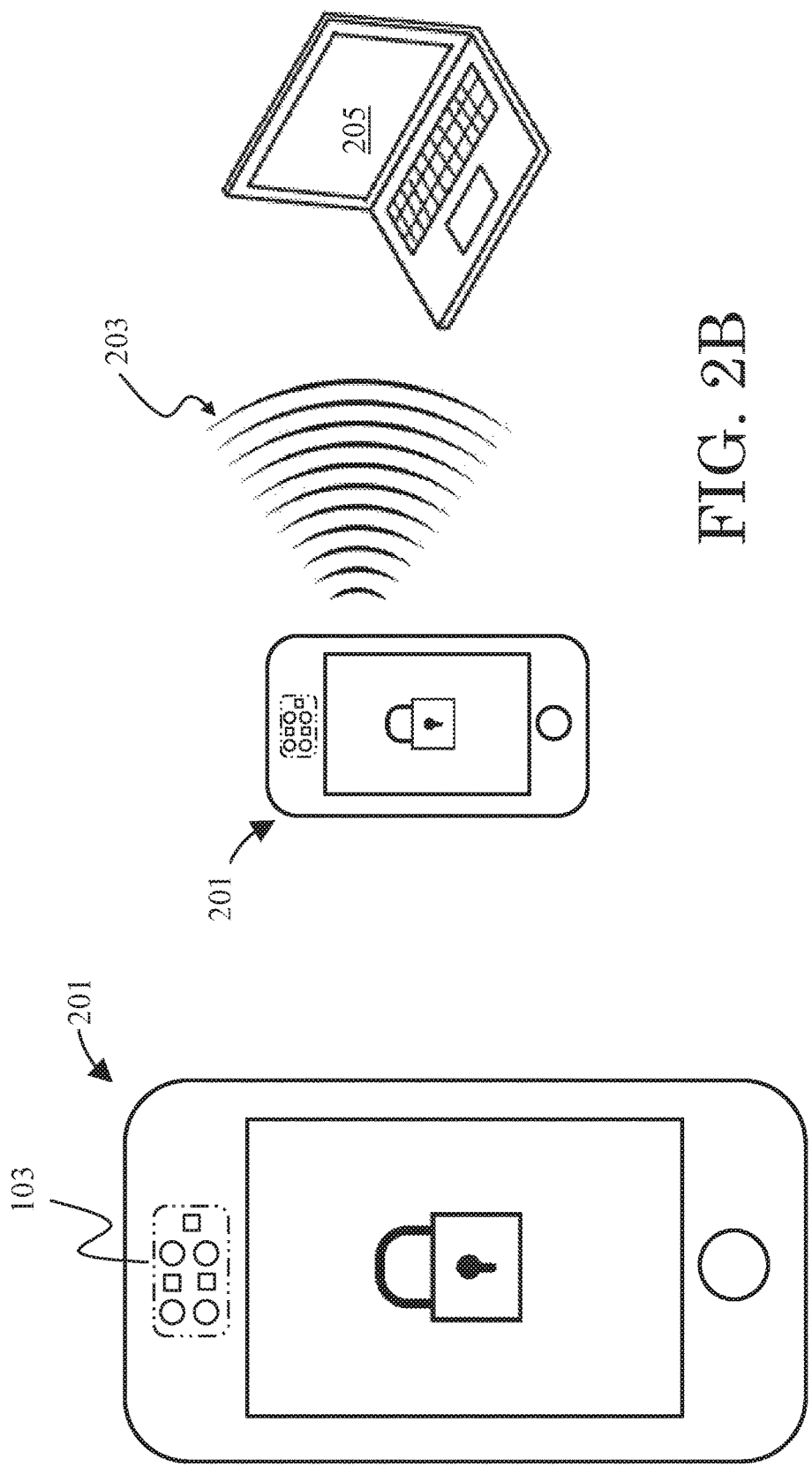
FIG. 2A depicts an example of an optoelectronic system including an auxiliary device.
FIG. 2B depicts an example in which the auxiliary device is communicatively coupled to another auxiliary device.

FIG. 2A depicts the array of optoelectronic modules 103 integrated into an auxiliary device 201, such as a smartphone, tablet computer, or laptop computer. The optoelectronic system 101 is not depicted in FIG. 2A, though the computational unit 105 and coupling 107 also can be integrated into the auxiliary device 201. In some instances, the auxiliary device 201 provides the computational unit 105 and at least a portion of the couplings 107. In general, the aforementioned user authentication protocols (e.g., facial recognition, and iris recognition) can be integrated into auxiliary device 201 pre-boot authentication or power-on authentication protocols, such that the optoelectronic system 101 operates external to the operating system implemented on the auxiliary device 201. Consequently, the optoelectronic system 101 can comprise a hardware authentication system for the auxiliary device 201, thus hacking of the auxiliary device 201 can be substantially minimized or eliminated in some instances.

In some instances, the auxiliary device 201 is communicatively coupled via a device coupling 203 to an additional auxiliary device 205 (see FIG. 2B). The device coupling 203 can be, for example, electrical contacts, wires, vias, and also can include wireless transmitters (e.g., radio-wave, Wi-Fi, and optical transmitters or transceivers). In general, the aforementioned user authentication protocols (e.g., facial recognition, and iris recognition) can be integrated into the additional auxiliary device 205 pre-boot authentication or power-on authentication protocols, such that the optoelectronic system 101 and auxiliary device 201 operate external to the operating system implemented on the additional auxiliary device 203. Consequently, the optoelectronic system 101 and auxiliary device 201 can comprise a hardware authentication system for the additional auxiliary device 205, thus hacking of the additional auxiliary device 205 can be substantially minimized or eliminated in some instances.

Following effective user authentication, the optoelectronic system 101 can be used, in conjunction with the auxiliary device 201 and/or the additional auxiliary device 205, to compile user-specific data, construct a user profile using the user-specific data, and can alter the operation of the optoelectronic system 101, the auxiliary device 201, and/or the additional auxiliary device 205 using the user profile.

For example, in instances where the auxiliary device 201 includes a display screen configured to display information, the optoelectronic system 101 can be used to track the gaze of the authorized user (e.g., the user's gaze with respect to content of the display screen). Consequently, gaze data can be generated. The gaze data can be used to augment interaction with the auxiliary device in some instances. For, example, automatic display screen scrolling can be executed effectively by using gaze data associated with the authorized user.

In some instances, gaze data can be used to ascertain the interests of the authorized user. For example, the duration an authorized user casts a gaze onto an item or region displayed on the display screen can be correlated with the authorized user's interests. Accordingly, a user interest profile can be generated from such gaze data. Such a user interest profile can be utilized, for example, for providing user-customized web-based shopping experiences.

In some instances, multiple users can be authorized to use the same auxiliary device 201 or additional auxiliary device 205. Accordingly, the optoelectronic system 101 can be used to identify an authorized user (i.e., via the aforementioned user authentication protocols) and to generate multiple sets of user-specific gaze data and a user interest profile. Consequently, user-customized automatic scrolling settings (e.g., speed), display screen brightness, size of text and/or images displayed on the display screen, and/or shopping profiles, can be constructed for each authorized user of the auxiliary device 201 and/or the additional auxiliary device 205.

In some instances, different authorized users may have different sensitivities to various components of the optoelectronic system 101. For example, an authorized child may have different a sensitivity to the spectral illuminator than an authorized adult. Accordingly, in such instances the authorized user can be identified and the user's sensitivity to the spectral illuminator can be determined (e.g., via an age look-up table), and the power to the spectral illuminator can be customized accordingly.

Figure 3:
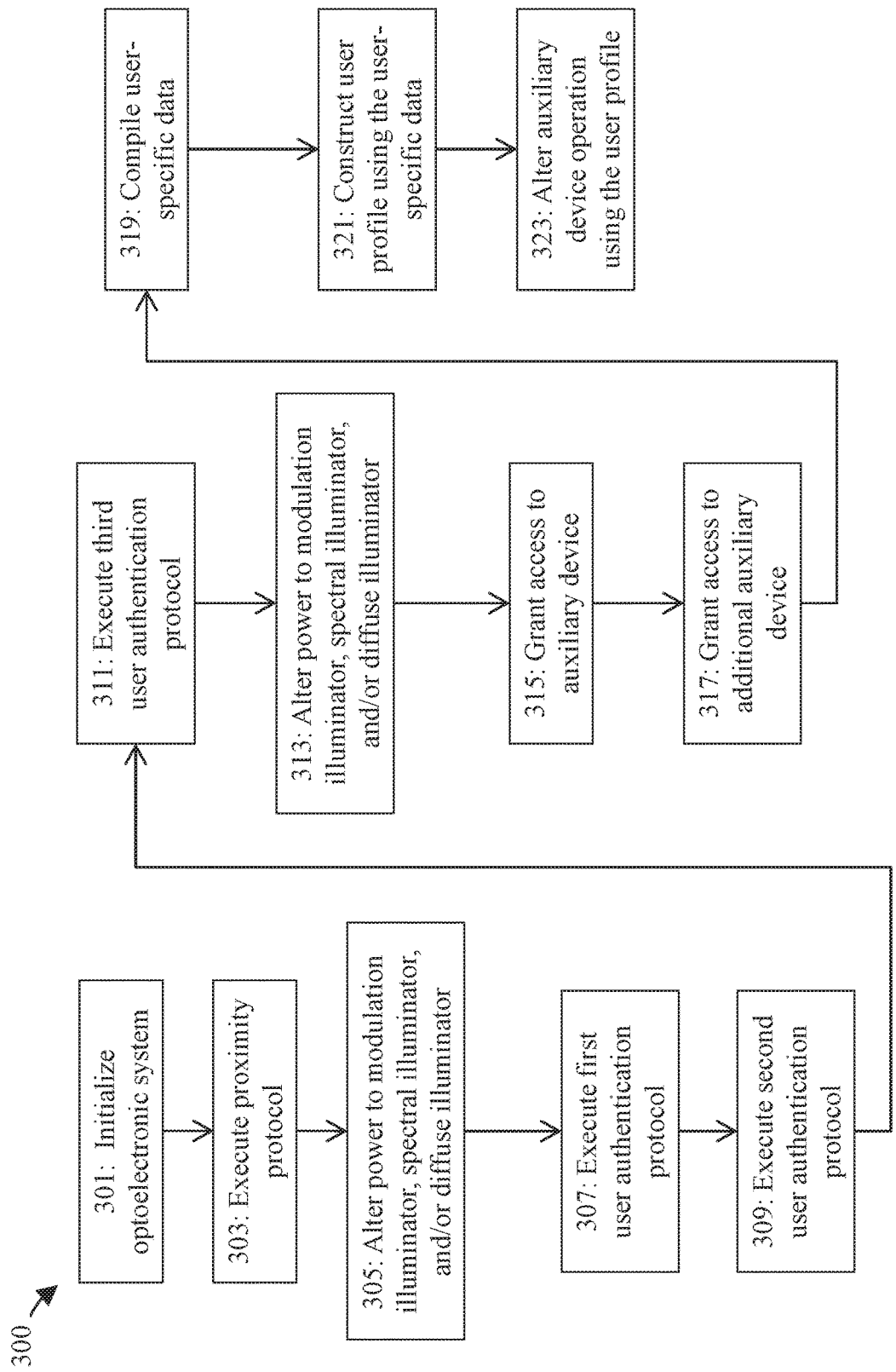
FIG. 3 depicts an example of a method for operating the optoelectronic system.

FIG. 3 depicts a method 300 for operating an optoelectronic system such as the optoelectronic system 101 depicted in FIG. 1 and further described in connection with FIGS. 2A and 2B. The method can be implemented using the array of optoelectronic modules 103 and the computational unit 105. As described above, the computational unit 105 can include a processor and a non-transitory computer readable medium. The non-transitory computer readable medium can store instructions that, when executed on the processor and in conjunction with one or more components in the array of optoelectronic modules 103 and the coupling 107, perform (or cause to be performed) one or more operations in the method 300 for operating the optoelectronic system 101. For example, at 301, the optoelectronic system 101 is initialized. In some instances, block 301 includes collecting initial user data (e.g., facial, and iris data) and storing the initial user data on the non-transitory computer-readable medium.

At 303, a proximity protocol is executed. In some instances, block 303 can include collecting proximity or distance data of the user of the optoelectronic system 101, auxiliary device 201, and/or additional auxiliary device 205 with the modulation illuminator 115 and the demodulation imager 117 via the indirect time-of-flight technique as described above. Block 303 can include storing the proximity data or distance data to the non-transitory computer-readable medium.

At 305, the power to the modulation illuminator 115, spectral illuminator 113, and/or diffuse illuminator 119 can be altered based on the stored proximity data or distance data. For example, the stored distance data may indicate that the user is too close to the spectral illuminator 113 for a given power level to operate safely. The power to the spectral illuminator 113 can then be reduced for user authentication protocols requiring the spectral illuminator 113.

At 307, a first user authentication protocol is executed. The first user authentication protocol can be, for example, a facial recognition protocol, iris recognition protocol, gaze-tracking protocol, or any combination of these protocols resulting in an enhanced user authentication protocol as described above. The first user authentication protocol can be implemented with the infrared-sensitive intensity imager 109, the auxiliary infrared-sensitive intensity imager 111, the spectral illuminator 113, the diffuse illuminator 119, the modulation illuminator 115, the demodulation imager 117, the visible light-sensitive intensity imager 121, the auxiliary device 201, and/or the additional auxiliary device 205. The results of the first user authentication protocol can be stored, for example, on the non-transitory computer-readable medium. For example, in instances where the first user authentication protocol is a facial recognition protocol, an image of the user's face may be stored to the non-transitory computer-readable medium. Further, the image may be compared to a verified image of the authorized user collected and stored, for example, during the initialization at 301.

At 309, a second user authentication protocol is executed. The second user authentication protocol can be, for example, a facial recognition protocol, iris recognition protocol, gaze-tracking protocol, or any combination of these protocols resulting in an enhanced user authentication protocol as described above. The second user authentication protocol can be implemented with the infrared-sensitive intensity imager 109, the auxiliary infrared-sensitive intensity imager 111, the spectral illuminator 113, the diffuse illuminator 119, the modulation illuminator 115, the demodulation imager 117, the visible light-sensitive intensity imager 121, the auxiliary device 201, and/or the additional auxiliary device 205. The results of the second user authentication protocol can be stored, for example, on the non-transitory computer-readable medium. For example, in instances where the second user authentication protocol is an iris recognition protocol, an image of the user's iris may be stored to the non-transitory computer-readable medium. Further, the image may be compared to a verified image of the authorized user collected and stored, for example, during the initialization at 301.

At 311, a third user authentication protocol is executed. The third user authentication protocol can be, for example, a facial recognition protocol, iris recognition protocol, gaze-tracking protocol, or any combination of these protocols resulting in an enhanced user authentication protocol as described above. The third user authentication protocol can be implemented with the infrared-sensitive intensity imager 109, the auxiliary infrared-sensitive intensity imager 111, the spectral illuminator 113, the diffuse illuminator 119, the modulation illuminator 115, the demodulation imager 117, the visible light-sensitive intensity imager 121, the auxiliary device 201, and/or the additional auxiliary device 205. The results of the third user authentication protocol can be stored, for example, on the non-transitory computer-readable medium. For example, in instances where the third user authentication protocol is a gaze-tracking protocol, a series of vectors describing a user's gaze-trace pattern may be stored to the non-transitory computer-readable medium. Further, the user's gaze-trace pattern may be compared to a gaze-trace pattern of the authorized user collected and stored, for example, during the initialization at 301.

At 313, power to the modulation illuminator 115, spectral illuminator 113, and/or diffuse illuminator 119 can be altered based on the results of the first user authentication protocol, second user authentication protocol, and/or third user authentication protocol. For example, in instances where a user is authenticated, data from the initialization step 301 associated with the authorized user can be used to customize the power level of the the modulation illuminator 115, spectral illuminator 113, and/or diffuse illuminator 119. For example, the age of the authorized user can be determined from the user data collected during the initialization. The power level suitable for a particular age can be determined from a lookup table stored on the non-transitory computer-readable medium. Consequently, any of the aforementioned components can be adjusted to an appropriate level according to the lookup table.

At 315, access to the auxiliary device 201 can be granted upon authentication of the user via the first, second, and/or third user authentication protocols. As described above, the aforementioned user authentication protocols (e.g., facial recognition, and iris recognition) can be integrated into the auxiliary device 201 pre-boot authentication or power-on authentication protocols, wherein the optoelectronic system 101 can operate external to the operating system implemented on the auxiliary device 201. Consequently, the optoelectronic system 101 can comprise a hardware authentication system for the auxiliary device 201, thus hacking of the auxiliary device 201 can be substantially minimized or eliminated in some instances.

At 317, access to the additional auxiliary device 205 can be granted upon authentication of the user via the first, second, and/or third user authentication protocols. As described above, the auxiliary device 201 can be communicatively coupled via a device coupling 203 to an additional auxiliary device 205. The device coupling 203 can be electrical contacts, wires, vias, and can also include wireless transmitters (e.g., radio-wave, Wi-Fi, and optical transmitters or transceivers). The aforementioned user authentication protocols (e.g., facial recognition, and iris recognition) can be integrated into the additional auxiliary device 205 pre-boot authentication or power-on authentication protocols, wherein the optoelectronic system 101 and auxiliary device 201 can operate external to the operating system implemented on the additional auxiliary device 203. Consequently, the optoelectronic system 101 and auxiliary device 201 can comprise a hardware authentication system for the additional auxiliary device 205, thus hacking of the additional auxiliary device 205 can be substantially minimized or eliminated in some instances.

At 319, user-specific data can be compiled and stored to the non-transitory computer-readable medium. As described above, in instances where the auxiliary device 201 and/or the additional auxiliary device 205 includes a display screen configured to display information, the optoelectronic system 101 can be used to track the gaze of the authorized user (e.g., the user's gaze with respect to content of the display screen). Consequently, gaze data can be generated.

At 321, a user profile using the user-specific data can be constructed. For example, the faze data described in step 319 can be used to ascertain the interests of the authorized user.

Thus, the duration the authorized user casts a gaze onto an item or region displayed on the display screen can be correlated with the authorized user's interests. Accordingly, a user interest profile can be generated from such gaze data. Such a user interest profile can be utilized, for example, for providing user-customized web-based shopping experience.

At 323, the operation of the auxiliary device 201 and/or the additional auxiliary device 205 using the user profile can be altered. For example, the gaze data within the user profile described at 319 may be used for automatic display screen scrolling.

Various implementations of the systems and techniques described here may be realized, at least in part, in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be readily apparent, various modifications can be made to the foregoing examples within the spirit of the invention. For example, in some instances, some processes or steps may be omitted. Further, in some cases, additional processes or steps may be performed. Other modifications may be made as well. For example, various components in the optoelectronic system 101 described above may be omitted and/or other components may be present. Thus, other implementations are within the scope of the claims.

What is claimed is:

1. An optoelectronic system comprising an array of optoelectronic modules, the array of optoelectronic modules comprising:
    an infrared-sensitive intensity imager, an auxiliary infrared-sensitive intensity imager, a spectral illuminator, a modulation illuminator, a demodulation imager, a diffuse illuminator, a visible light-sensitive imager, and a computational unit;
    wherein each of the infrared-sensitive intensity imager, the auxiliary infrared-sensitive intensity imager, the spectral illuminator, the modulation illuminator, the demodulation imager, the diffuse illuminator, and the visible light-sensitive imager is communicatively coupled to the computational unit via a respective coupling; and
    the computational unit includes a processor and a non-transitory computer readable medium, the non-transitory computer readable medium comprising machine readable instructions stored thereon that, when executed by the processor, cause the processor to operate the optoelectronic system,
    wherein the computational unit is operable to execute a first user authentication protocol, the first user authentication protocol including a gaze tracking protocol, an iris recognition protocol, a facial recognition protocol, and/or any of the aforementioned user authentication protocols enhanced by data collected using the infrared-sensitive intensity imager, the auxiliary infrared-sensitive intensity imager, the spectral illuminator, the modulation illuminator, the demodulation imager, the diffuse illuminator, and/or the visible light-sensitive imager.

2. The optoelectronic system of claim 1 wherein the non-transitory computer readable medium stores instructions thereon that when executed by the processor cause the processor to initialize the optoelectronic system, execute a proximity protocol, and alter power to the modulation illuminator, spectral illuminator, and/or diffuse illuminator.

3. The optoelectronic system as in claim 1, in which the data collected using the infrared-sensitive intensity imager, the auxiliary infrared-sensitive intensity imager, the spectral illuminator, the modulation illuminator, the demodulation imager, the diffuse illuminator, and/or the visible light-sensitive imager includes distance data, three-dimensional data, and/or user eye color data.

4. The optoelectronic system as in claim 1, wherein the non-transitory computer readable medium stores instructions thereon that when executed by the processor cause the processor to alter the power to the modulation illuminator, the spectral illuminator, and/or the diffuse illuminator.

5. The optoelectronic system as in claim 1, wherein the non-transitory computer readable medium stores instructions thereon that when executed by the processor cause the processor to grant access to an auxiliary device.

6. The optoelectronic system of claim 5 wherein the non-transitory computer readable medium stores instructions thereon that when executed by the processor cause the processor to grant access to an additional auxiliary device.

7. The optoelectronic system of claim 5 wherein the non-transitory computer readable medium stores instructions thereon that when executed by the processor cause the processor to compile user-specific data.

8. The optoelectronic system of claim 6 wherein the non-transitory computer-readable medium stores instructions thereon that when executed by the processor cause the processor to compile user-specific data.

9. The optoelectronic system of claim 7 wherein the non-transitory computer-readable medium stores instructions thereon that when executed by the processor cause the processor to construct a user profile using the user-specific data.

10. The optoelectronic system of claim 8 wherein the non-transitory computer-readable medium stores instructions thereon that when executed by the processor cause the processor to construct a user profile using the user-specific data.

11. The optoelectronic system of claim 9 wherein the non-transitory computer-readable medium stores instructions thereon that when executed by the processor cause the processor to alter an operation of the auxiliary device using the user profile.

12. The optoelectronic system of claim 10 wherein the non-transitory computer-readable medium stores instructions thereon that when executed by the processor cause the processor to alter an operation of the auxiliary device using the user profile.

13. A method for operating an optoelectronic system, the method comprising:
    initializing an optoelectronic system, the optoelectronic system including an infrared-sensitive intensity imager, an auxiliary infrared-sensitive intensity imager, a spectral illuminator, a modulation illuminator, a demodulation imager, a diffuse illuminator, a visible light-sensitive imager, and a computational unit, wherein each of the infrared-sensitive intensity imager, the auxiliary infrared-sensitive intensity imager, the spectral illuminator, the modulation illuminator, the demodulation imager, the diffuse illuminator, and the visible light-sensitive imager is communicatively coupled to the computational unit; and
    executing, by the computational unit, a first user authentication protocol, the first user authentication protocol including a gaze tracking protocol, an iris recognition protocol, a facial recognition protocol, and/or any of the aforementioned user authentication protocols enhanced by data collected using the infrared-sensitive intensity imager, the auxiliary infrared-sensitive intensity imager, the spectral illuminator, the modulation illuminator, the demodulation imager, the diffuse illuminator, and/or the visible light-sensitive imager.

14. The method for operating an optoelectronic system of claim 13, the method further comprising: executing a proximity protocol, and altering power to the modulation illuminator, the spectral illuminator, and/or the diffuse illuminator.

15. The method for operating an optoelectronic system as in claim 13, wherein the method further comprises granting access to an auxiliary device.

16. The method for operating an optoelectronic system of claim 15, the method further comprising granting access to an additional auxiliary device.

17. The method for operating an optoelectronic system as in claim 13, wherein the method further comprises compiling user-specific data.

18. The method for operating an optoelectronic system of claim 17, the method further comprising constructing a user profile using the user-specific data.

19. The method for operating an optoelectronic system of claim 15, the method further comprising compiling user-specific data and constructing a user profile based on the user specific data, and altering the auxiliary device operation using the user profile.

20. The method for operating an optoelectronic system of claim 16, the method further comprising compiling user-specific data and constructing a user profile based on the user specific data, and altering the additional auxiliary device operation using the user profile.

* * * * *

UNITED STATES PATENT AND TRADEMARK OFFICE
CERTIFICATE OF CORRECTION

Page 1 of 1

PATENT NO. : 10,298,570 B2
APPLICATION NO. : 15/447341
DATED : May 21, 2019
INVENTOR(S) : Yibin Tian It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 247 days.

Signed and Sealed this
Twenty-fourth Day of January, 2023

Katherine Kelly Vidal
*Director of the United States Patent and Trademark Office*